Sept. 2, 1969 HENRY CHIN ET AL 3,465,173
ELECTRONIC SHUTTER EMPLOYING TWO NORMALLY NONCONDUCTING SCR'S IN WHICH SECOND SCR IS SELF-EXTINGUISHING BY RC TIMER AND IS TRIGGERED ON WHEN FIRST SCR TURNS OFF
Filed Jan. 4, 1967
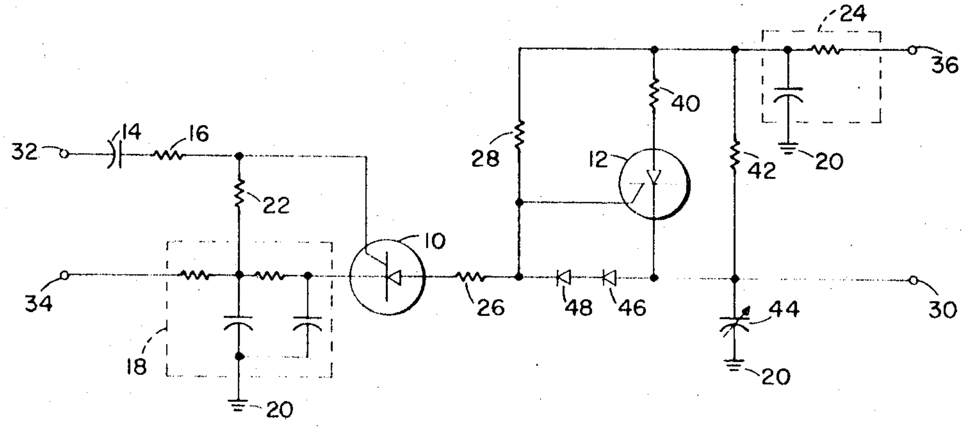
Henry Chin
Joseph Salvato,
INVENTORS.
Harry M. Saragovitz
BY Edward J. Kelly
Herbert Berl
Alfred E. Smith

United States Patent Office 3,465,173

Patented Sept. 2, 1969

3,465,173

ELECTRONIC SHUTTER EMPLOYING TWO NORMALLY NONCONDUCTING SCR's IN WHICH SECOND SCR IS SELF-EXTINGUISHING BY RC TIMER AND IS TRIGGERED ON WHEN FIRST SCR TURNS OFF

Henry Chin, Burlington, and Joseph Salvato, Medford, Mass., assignors, by mesne assignments, to the United States of America as represented by the Secretary of the Army Filed Jan. 4, 1967, Ser. No. 607,611
Int. Cl. H03k 17/28
U.S. Cl. 307—293 4 Claims

ABSTRACT OF THE DISCLOSURE

An electronic shutter for photoelectric devices wherein the photocathode voltage of an image orthicon is switched on rapidly, held on for a controlled and variable time duration, and then switched off rapidly. The voltage to a variable capacitive load is controlled by two silicon controlled rectifiers and associated biasing circuitry. The first rectifier, responsive to an input voltage, discharges the load. The second rectifier, connected to a source voltage and the load, is responsive to the deactivation of the first rectifier to activate and reset the circuit. When the load potential restores to a predetermined value the second rectifier deactivates and the circuit is reset.

This invention in general relates to photoelectric devices and in particular relates to an electronic shutter for controlling an image orthicon.

In converting light energy to electrical energy, phototubes serve as translating devices. The image orthicon, a phototube often used as a television camera tube, converts an optical image into a time-varying electrical signal. The ability of this tube to handle a wide range of light levels with a fast response and high resolution is in some applications foreshadowed by less than adequate sensitivity. This is especially true when a high intensity light source is in use.

Shuttering can be employed to limit the amount of light applied to an image orthicon, or other phototube, thereby protecting the tube from over-driving destruction and increasing the sensitivity thereof. Rapid shuttering allows either an almost continuous translation of light energy or a periodic translation; this would be determined by the need and the speed capability of the shutter.

An object of this invention is to provide a means for controlling the period of time of operation of a phototube.

A further object of this invention is to increase the sensitivity of an image orthicon.

Another object of this invention is to protect the phototube from destruction that could be caused when used with a high intensity light source.

Other objects and advantages of this invention will be better understood from the following detailed description of a preferred embodiment of the invention, and from the accompanying drawing illustrating an example of the invention.

The single figure shows a schematic diagram incorporating the preferred embodiment of this invention.

Referring now to the single figure wherein a first silicon controlled rectifier 10 in conjunction with an input waveform controls the output pulse width at a terminal 30, and a second silicon controlled rectifier 12 resets the circuit when rectifier 10 is turned off.

The input gate signal is applied to an input terminal 32, and is connected through a differentiating network composed of capacitor 14 and resistors 16 and 22 to a cathode gate of rectifier 10. A negative focusing voltage of approximately 500 volts is supplied to a terminal 34 and is connected through a filter network 18 to a cathode of rectifier 10. Filter network 18 is also connected to a common ground 20 and through resistor 22 to the cathode gate of rectifier 10 thereby providing a path to ground 20 for the input gate signal. A positive voltage is supplied to a terminal 36 and connected to one side of a resistance-capacitance filter 24. An anode of rectifier 10 is connected through series connected load resistors 26 and 28 to a second side of filter 24. An anode of rectifier 12 is connected through a resistor 40 to the second side of filter 24 and through a resistor 42 to a cathode of rectifier 12. The cathode of rectifier 12 is connected to output terminal 30, to a variable capacitor 44, and through a series connected pair of diodes in the forward direction to a cathode gate of rectifier 12. The cathode gate is also connected to the common connection between resistor 26 and resistor 28.

The steady state condition of the circuit is such that the positive voltage applied to terminal 36 is normally felt on the cathode and cathode gate of rectifier 12, and on output terminal 30. Capacitor 44 in conjunction with a load capacitance, if any, is charged to the positive voltage thereby maintaining rectifier 12 in an off state while rectifier 10 is switching ON. An input gate signal applied to terminal 32 activates rectifier 10 which opens up a discharge path from capacitor 44 through diodes 46 and 48 and filter network 18. The potential on capacitor 44 and on output terminal 30 will approach that of the negative input focusing voltage applied to terminal 34. Rectifier 10 will turn off with no assistance when the capacitance at terminal 30 is fully discharged and the input gate signal at terminal 32 is removed. Rectifier 10 can be turned off by removing the input gate voltage prior to complete discharge of the capacitance at terminal 30 if resistor 28 is used to maintain the current drawn by rectifier 10 to a small value. This affords a precise control of the output pulse width at terminal 30.

When rectifier 10 has turned off, the voltage at the rectifier 12 control gate will return to that of the positive voltage applied to terminal 36. This positive voltage coupled with the negative voltage present on the cathode of rectifier 12, due to the negative charge at terminal 30, will cause rectifier 12 to turn on rapidly. Rectifier 12 will continue to conduct until the potential at terminal 30 is equivalent to the voltage at the cathode gate of rectifier 12 at which time rectifier 12 will automatically turn off and the circuit will be reset.

Although a particular embodiment and form of this invention has been illustrated, it is understood that modifications may be made by those skilled in the art without departing from the scope and spirit of the foregoing disclosure.

What is claimed is:

1. An electronic shutter for controlling a variable time period of operation comprising: a controllable load including a variable capacitance; a positive voltage source connected across said capacitance; a first silicon controlled rectifier connected across said capacitor to activate and provide a discharge path therefor; a second silicon controlled rectifier connected to said positive voltage source and said capacitor for resetting said capacitor, said first and second silicon controlled rectifiers having an anode, a cathode, and a cathode gate; an input signal source; and an output terminal connected to the cathode of said second rectifier and through said variable load capacitance to a common ground; said first rectifier having the anode and cathode thereof connected across said capacitance and the cathode gate connected to said input signal source, and the cathode gate and anode of said second rectifier being connected to said positive voltage source.

2. The electronic shutter as set forth in claim 1 further comprising; a resistance-capacitance differentiating network connected between said signal source and the cathode gate of said first rectifier; a negative focusing voltage input source; a first filter network connected between the cathode of said first rectifier and said negative input source; a second filter connected between the anode of said first rectifier and said positive voltage source; a diode connected in a forward direction from said output terminal to the anode of said first rectifier.

3. The electronic shutter as set forth in claim 1 wherein the cathode gate of said second rectifier is connected to the anode of said first rectifier; and the anode of the second rectifier is connected to the positive voltage source.

4. The electronic shutter as set forth in claim 2 wherein the cathode gate of said second rectifier is connected to the anode of said first rectifier; and the anode of said second rectifier is connected through said second filter to the positive voltage source.

References Cited

UNITED STATES PATENTS

| | | | |
|---|---|---|---|
| 3,105,160 | 9/1963 | Adler | 307—294 X |
| 3,214,696 | 10/1965 | Hickey | 328—67 |
| 3,331,968 | 7/1967 | Hickey | 328—67 X |
| 3,337,755 | 8/1967 | Grabowski | 328—67 X |
| 3,359,498 | 12/1967 | Harris | 328—67 X |

JOHN S. HEYMAN, Primary Examiner

U.S. Cl. X.R.

307—274, 284